(12) United States Patent
Yi et al.

(10) Patent No.: US 11,665,554 B2
(45) Date of Patent: May 30, 2023

(54) BEAM MANAGEMENT METHOD, APPARATUS THEREOF AND BEAM MANAGEMENT DEVICE

(71) Applicant: FUJITSU LIMITED, Kawasaki (JP)

(72) Inventors: Su Yi, Beijing (CN); Gang Sun, Beijing (CN); Xin Wang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 82 days.

(21) Appl. No.: 17/246,727

(22) Filed: May 3, 2021

(65) Prior Publication Data

US 2021/0352492 A1 Nov. 11, 2021

(30) Foreign Application Priority Data

May 11, 2020 (CN) .......................... 202010391954.5

(51) Int. Cl.
*H04W 4/00* (2018.01)
*H04W 16/28* (2009.01)
(Continued)

(52) U.S. Cl.
CPC .......... *H04W 16/28* (2013.01); *G06F 16/245* (2019.01); *G06F 16/29* (2019.01); *H04B 7/0617* (2013.01);
(Continued)

(58) Field of Classification Search
CPC .............................. H04B 7/088; H04B 7/0695
See application file for complete search history.

(56) References Cited

U.S. PATENT DOCUMENTS 10,517,061 B1* 12/2019 Kumar ................. H04W 24/08
2017/0117628 A1 4/2017 Banasky et al.
(Continued)

FOREIGN PATENT DOCUMENTS

CN 107069184 A 8/2017
CN 108781098 A 11/2018
(Continued)

OTHER PUBLICATIONS

Xuedong et al., "Study and Application Prospect of Automatic Tracking System Spanning the Spot Beam of IP-STAR Satellite's Antenna", Digital Communication Word, 2015, with English abstract.
(Continued)

*Primary Examiner* — Chi H Pham
*Assistant Examiner* — Elisabeth Benoit Magloire
(74) *Attorney, Agent, or Firm* — Myers Wolin, LLC

(57) ABSTRACT

A beam management method, an apparatus thereof and an intelligent beam management device. The method includes: querying a database according to position information ($x_0$, $y_0$, $z_0$) of a terminal equipment, the database including multiple entries, each entry containing beam measurement related information of a point ($x_i$, $y_i$, $z_i$), selecting entries corresponding to points in a predetermined range of the terminal equipment from the database; selecting no more than a first number of base station transmitter beam identifiers with the highest number of occurrences from all the selected entries; and determining a base station transmitter beam serving the terminal equipment according to whether beams corresponding to the no more than a first number of base station transmitter beam identifiers belong to a serving base station or another base station.

10 Claims, 6 Drawing Sheets

---

301 — a database is queried according to position information of a terminal equipment, the database including multiple entries, each entry containing beam measurement related information of a point, and entries corresponding to points in a predetermined range of the terminal equipment are selected from the database 302 — no more than a first number of IDs of base station transmitter beams with the highest number of occurrences among IDs of base station transmitted beams are selected from all the selected entries 303 — a base station transmitter beam serving the terminal equipment is determined according to whether beams corresponding to the no more than a first number of IDs of base station transmitter beams belong to a serving base station or another base station

(51) Int. Cl.
  *H04B 7/08*   (2006.01)
  *H04B 7/06*   (2006.01)
  *G06F 16/29*   (2019.01)
  *H04B 17/318*   (2015.01)
  *G06F 16/245*   (2019.01)

(52) U.S. Cl.
  CPC ........... *H04B 7/0695* (2013.01); *H04B 7/088* (2013.01); *H04B 17/318* (2015.01)

(56) References Cited

U.S. PATENT DOCUMENTS

| | | | |
|---|---|---|---|
| 2017/0331670 A1* | 11/2017 | Parkvall | H04J 11/0079 |
| 2018/0075746 A1 | 3/2018 | Jiang et al. | |
| 2019/0014510 A1 | 1/2019 | Rune | |
| 2019/0036224 A1 | 1/2019 | McCollough et al. | |
| 2020/0145977 A1* | 5/2020 | Kumar | H04L 5/0048 |
| 2020/0267684 A1* | 8/2020 | Huang | H04L 5/0051 |
| 2020/0275402 A1* | 8/2020 | Shi | H04W 16/28 |
| 2021/0329417 A1* | 10/2021 | Priyanto | G01S 5/10 |
| 2022/0095257 A1* | 3/2022 | Castaneda | H04B 7/0695 |
| 2022/0146620 A1* | 5/2022 | Alawieh | H04L 5/0051 |
| 2022/0167180 A1* | 5/2022 | Choi | H04L 1/1671 |
| 2022/0247474 A1* | 8/2022 | Rune | H04B 7/024 |
| 2022/0283259 A1* | 9/2022 | Tao | H04W 64/006 |

FOREIGN PATENT DOCUMENTS

| | | | |
|---|---|---|---|
| CN | 109845128 A | | 6/2019 |
| WO | WO-2019199935 A1 * | 10/2019 | ............ G01S 1/042 |

OTHER PUBLICATIONS

Va et al., "Online Learning for Position-Aided Millimeter Wave Beam Training", IEEE Access, Sep. 21, 2018.

* cited by examiner

BEAM MANAGEMENT METHOD, APPARATUS THEREOF AND BEAM MANAGEMENT DEVICE

CROSS REFERENCE TO RELATED APPLICATION

This U.S. patent application claims foreign priority to Chinese Patent Application No. 202010391954.5, filed on May 11, 2020, the contents of which are herein incorporated by reference.

FIELD

This disclosure relates to the field of communication technologies.

BACKGROUND 5G (5th generation mobile networks or 5th generation wireless systems, 5th-Generation, referred to as 5G or 5G technology) NR (New Radio) millimeter wave (mmWave) frequencies provide a huge bandwidth, and may provide unprecedented data rates for next-generation cellular mobile terminals. However, millimeter-wave links are extremely susceptible to rapid channel changes, and suffer from severe free-space pathloss and atmospheric absorption. In order to deal with these challenges, network devices (such as gNBs) and terminal equipments (such as UEs) will use highly directional antennas to achieve sufficient link budget. Therefore, it is necessary to precisely align transmitter and receiver beams.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in mmWave systems with analog beamforming function, effective beam alignment is critical, especially in rapidly changing settings. In some scenarios, rapid beam switching may be required due to sudden occlusion effects, which will cause a sudden drop in received signal strength. In addition, beam alignment/switching is an operation that may increase latency, and is/are of great significance to a control layer procedures and data transmission performance.

Embodiments of this disclosure provide a beam management method, an apparatus thereof and a beam management device, so as to reduce beam switching delay or cell handover delay and avoid beam failure, thereby improving communication reliability.

According to one aspect of the embodiments of this disclosure, there is provided a beam management method, wherein the method includes:

querying a database according to position information ($x_0$, $y_0$, $z_0$) of a terminal equipment, the database including multiple entries, each entry containing beam measurement related information of a point ($x_i$, $y_i$, $z_i$), and selecting entries corresponding to points in a predetermined range of the terminal equipment from the database;

selecting no more than a first number of IDs of base station transmitter beams with the highest number of occurrences from all the selected entries; and determining base station transmitter beams serving the terminal equipment according to whether beams corresponding to the no more than a first number of IDs of base station transmitter beams belong to a serving base station or another base station;

wherein in the beams corresponding to the no more than a first number of IDs of base station transmitter beams, if the number of beams belonging to the other base station is greater than the number of beams belonging to the serving base station, the terminal equipment is handed over to the other base station, and a base station transmitter beam serving the terminal equipment is determined according to a beam selection result of the other base station;

and in the beams corresponding to the no more than a first number of IDs of base station transmitter beams, if the number of beams belonging to the serving base station is greater than or equal to the number of beams belonging to the other base station, a base station transmitter beam serving the terminal equipment is selected for the terminal equipment according to the beams belonging to the serving base station.

According to another aspect of the embodiments of this disclosure, there is provided a beam management apparatus, wherein the apparatus includes:

a first selecting unit configured to query a database according to position information ($x_0$, $y_0$, $z_0$) of a terminal equipment, the database including multiple entries, each entry containing beam measurement related information of a point ($x_i$, $y_i$, $z_i$), and select entries corresponding to points in a predetermined range of the terminal equipment from the database;

a second selecting unit configured to select no more than a first number of IDs of base station transmitter beams with the highest number of occurrences from all the selected entries; and a processing unit configured to determine base station transmitter beams serving the terminal equipment according to whether beams corresponding to the no more than a first number of IDs of base station transmitter beams belong to a serving base station or another base station;

wherein, in the beams corresponding to the no more than a first number of IDs of base station transmitter beams, if the number of beams belonging to the other base station is greater than the number of beams belonging to the serving base station, the processing unit hands the terminal equipment over to the other base station, and determines a base station transmitter beam serving the terminal equipment according to a beam selection result of the other base station;

and in the beams corresponding to the no more than a first number of IDs of base station transmitter beams, if the number of beams belonging to the serving base station is greater than or equal to the number of beams belonging to the other base station, the processing unit selects a base station transmitter beam serving the terminal equipment according to the beams belonging to the serving base station.

According to a further aspect of the embodiments of this disclosure, there is provided a beam management device, wherein the beam management device includes a processor and a memory, the memory storing a computer program, and the processor being configured to execute the computer program to carry out a beam management method as below:

querying a database according to position information ($x_0$, $y_0$, $z_0$) of a terminal equipment, the database including multiple entries, each entry containing beam measurement related information of a point ($x_i$, $y_i$, $z_i$), and selecting entries corresponding to points in a predetermined range of the terminal equipment from the database;

selecting no more than a first number of IDs of base station transmitter beams with the highest number of occurrences from all the selected entries; and determining base station transmitter beams serving the terminal equipment according to whether beams corresponding to the no more than a first number of IDs of base station transmitter beams belong to a serving base station or another base station;

wherein in the beams corresponding to the no more than a first number of IDs of base station transmitter beams, if the number of beams belonging to the other base station is greater than the number of beams belonging to the serving base station, the terminal equipment is handed over to the other base station, and a base station transmitter beam serving the terminal equipment is determined according to a beam selection result of the other base station;

and in the beams corresponding to the no more than a first number of IDs of base station transmitter beams, if the number of beams belonging to the serving base station is greater than or equal to the number of beams belonging to the other base station, a base station transmitter beam serving the terminal equipment is selected for the terminal equipment according to the beams belonging to the serving base station.

An advantage of the embodiments of this disclosure exists in that according to the embodiments of this disclosure, beam switching delay or cell handover delay is reduced, and beam failure is avoided, thereby improving communication reliability.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
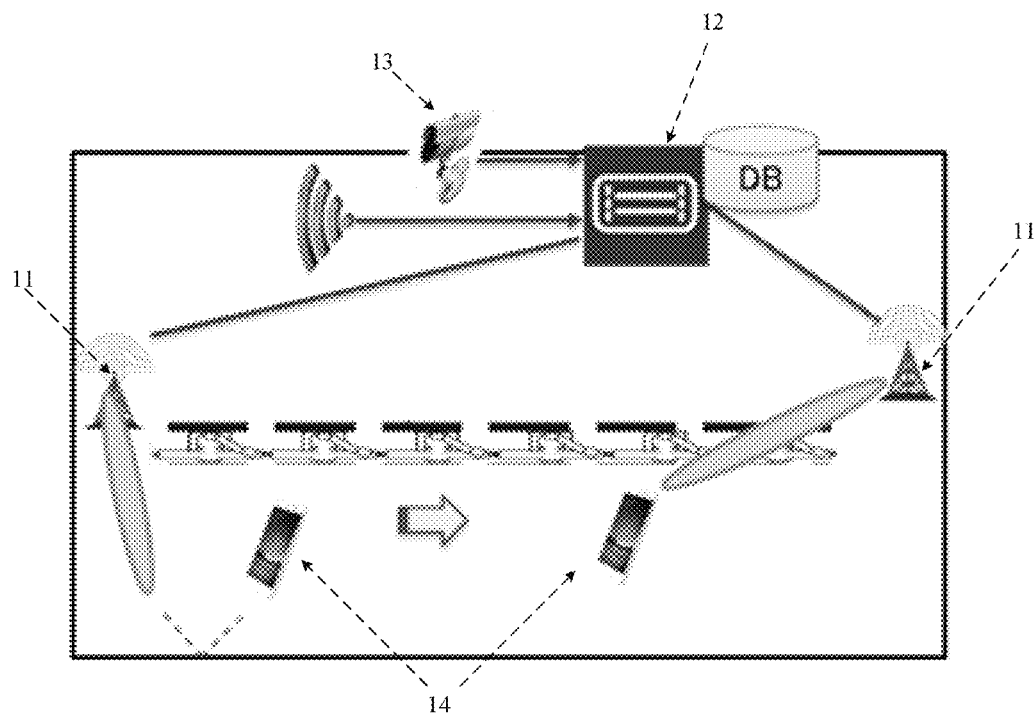
FIG. 1 is a schematic diagram of an example of a scenario of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the above embodiments, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, an equipment accessing to a communication network and receiving network services via a network device, and may also be referred to as. The terminal equipment may be fixed or mobile, and may also be referred to as a mobile station (MS), a terminal, a subscriber station (SS), an access terminal (AT), or a station, etc.

In the above embodiments, the terminal equipment may include but not limited to the following devices: a cellular phone, a personal digital assistant (PDA), a wireless modem, a wireless communication device, a hand-held device, a machine-type communication device, a lap-top, a cordless telephone, an intelligent cell phone, an intelligent watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, requirements on beam alignment under two typical conditions are considered, which are common in factory deployment. One scenario is that there exist obstacles in the factory, such as large machines, clutters, pillars, or other large objects, and a mobile terminal is moving. In this case, multipath propagation environment of a link from a gNB to a UE may possibly change between LOS (line of sight) and NLOS (non-line of sight). Another scenario is that the terminal is a stable sensor, and at some time there may be moving obstacles that will cause wireless propagation to be blocked.

Communication used for automation in the vertical domain has critical requirements, that is, high availability, high reliability, low latency, and in some cases, it also requires high-precision positioning. An embodiment of this disclosure proposes a beam management method, which can reduce beam switching delay or cell handover delay, avoid beam failure, and improve communication reliability.

FIG. 1 is a schematic diagram of an example of a scenario of the embodiment of this disclosure. As shown in FIG. 1, in a factory layout scenario, there is a gNB 11 with a large number of narrow beams on the left and right sides of the factory layout, respectively. They are connected to an MEC (mobile edge computing) server 12 that is able to assist in fast beam tracking and handover. External sensors (such as radars or cameras) 13 are connected to the MEC server 12. These sensors 13 may detect changes in the environment, such as obstacles or someone moving to a place, etc. They may transmit detection results to the MEC server 12. The MEC server 12 notifies gNBs 11 to perform beam adjustment according to information from the sensors 13 and database information.

There is a production line in the middle of the factory layout, which is deemed as an obstacle as it is of a metal material. UE 14 moves from the left side of the factory to the right side. During this trajectory, multipath propagation conditions changed a lot, from the first LOS to the NLOS, and then back to the LOS. The solution proposed in the embodiments of this disclosure will achieve location-based fast beam management and cell handover, so that the UE may be served by desired gNB beamforming without experiencing long-time delay or service interruption. In this disclosure, it is assumed that the gNBs 11 and the MEC server 12 know the location of the UE 14. For example, positioning methods such as GPS or communication signal-based methods may be used, which is not limited in this disclosure.

Figure 2:
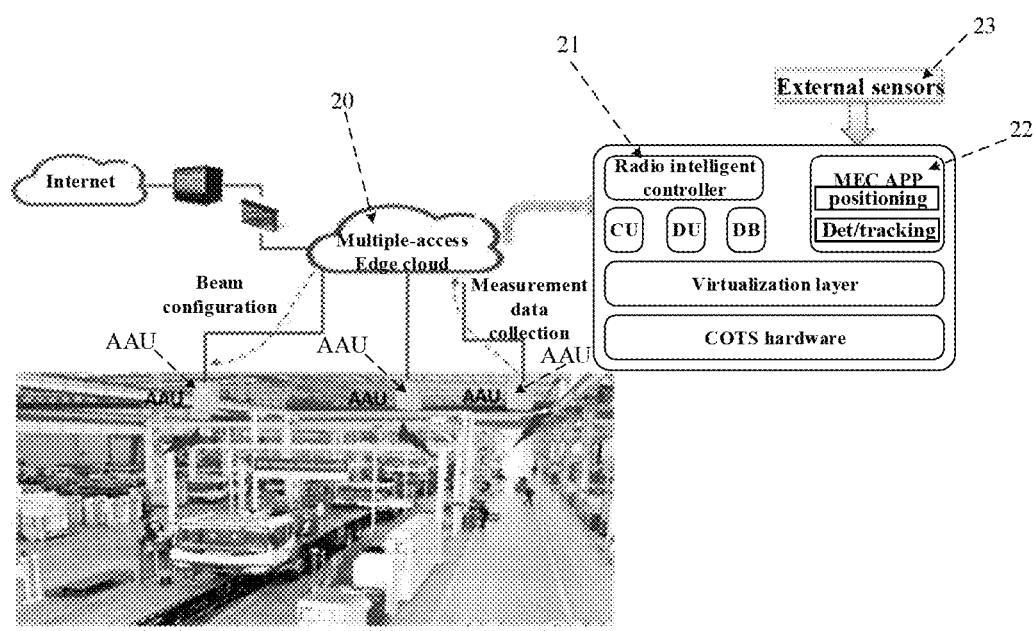
FIG. 2 is a schematic diagram of another example of the scenario of the embodiment of this disclosure.

FIG. 2 is a schematic diagram of another example of the application scenario of the embodiment of this disclosure. As shown in FIG. 2, in another scenario of the factory layout, processing functions of all gNBs are integrated in multiple-access edge cloud 20. In the multi-access edge cloud 20, there is a wireless intelligent controller 21, which is able to implement a learning algorithm for intelligent beamforming. In the multi-access edge cloud 20, there is also an MEC application 22, which collects data from external sensors 23 and implements such applications as positioning, detection, and tracking.

In addition, an RRU (remote radio Unit) and an antenna are integrated together to form an AAU (active antenna unit), and the AAU is connected to the multi-access edge cloud 20. The AAU needs to report measurement data to the multi-access edge cloud 20. The multiple access edge cloud 20 may perform beam configuration, such as CSI-RS (channel state information reference signal) resource setting, etc. Such kind of deployment with a centralized control function may be compatible with a C-RAN (cloud-radio access network) or O-RAN (open-RAN, open radio access network) architecture. In addition, in the multi-access edge cloud 20, other functions may also be integrated, such as a CU (central unit), a DU (distributed unit), a virtualization layer, COTS (commercial off-the-shelf) hardware, and a database (DB), etc., and reference may be made to related techniques for details, which are not limited in this disclosure.

Various implementations of the embodiments of this disclosure shall be described with reference to the accompanying drawings. These implementations are illustrative only, and are not intended to limit this disclosure.

Embodiment of a First Aspect

This disclosure includes an offline training phase and an online learning phase. In the offline training phase, a signal detector is used to perform field surveys on different locations. Each network device (gNB) sweeps beams to find a best transmission and reception point (TRP) and a beam ID. Site survey information (multi-path fingerprints) is stores in a database. MEC-assisted fast beam management and handover are realized by online learning. The MEC uses database information, and external sensors may help detect blockage.

According to the embodiment of this disclosure, online training or a large number of beam measurements may be avoided, delay may be reduced, and a possibility of beam failure or radio link failure may be reduced.

Implementations of the embodiment of this disclosure shall be described below with reference to the accompanying drawings. Beams described below refer to downlink beams of a base station, that is, transmission beams of the base station, which are collectively referred to as "beams" or "base station transmitter beam". In a TDD system, the same beams may be used in uplink and downlink. Therefore, in the TDD system, downlink beams selected in this disclosure may also be used for uplink reception of the base station. Beam selection of a terminal is not limited in this disclosure.

The embodiment of this disclosure provides a beam management method, applicable to an intelligent beam management device. The intelligent beam management device may integrate functions of a network device, such as multi-access edge cloud 20 in a scenario shown in FIG. 2, and it may also not integrate functions of a network device, such as an MEC server 12 in a scenario shown in FIG. 1. Following description shall be given by taking that the network device is a base station as an example.

Figure 3:
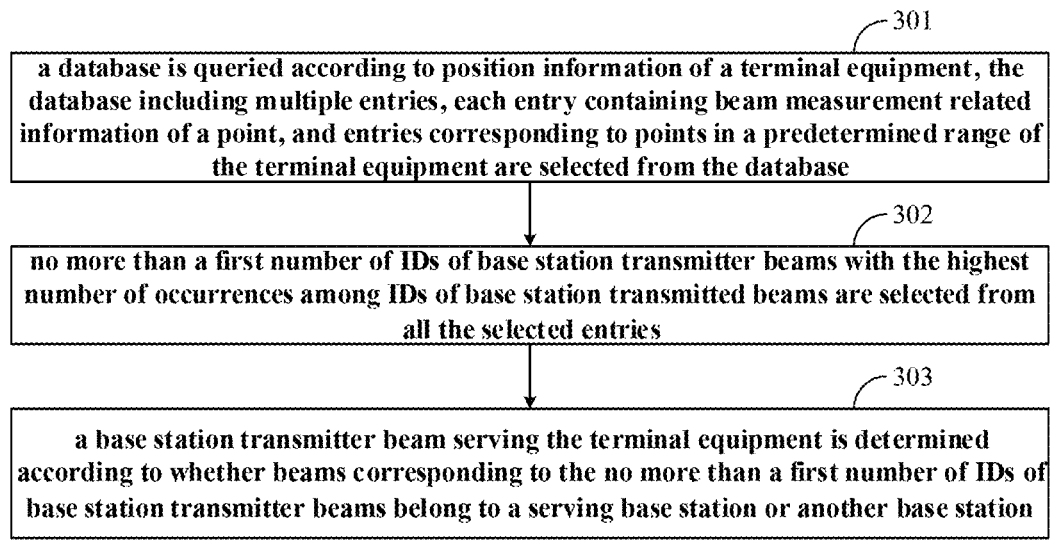
FIG. 3 is a schematic diagram of the beam management method of an embodiment of this disclosure.

FIG. 3 is a schematic diagram of the beam management method of the embodiment of this disclosure. Referring to FIG. 3, the method includes:

301: a database is queried according to position information ($x_0$, $y_0$, $z_0$) of a terminal equipment, the database including multiple entries, each entry containing beam measurement related information of a point ($x_i$, $y_i$, $z_i$), and entries corresponding to points in a predetermined range of the terminal equipment are selected from the database;

302: no more than a first number of IDs of base station transmitter beams with the highest number of occurrences among IDs of base station transmitted beams are selected from all the selected entries; and 303: a base station transmitter beam serving the terminal equipment is determined according to whether beams corresponding to the no more than a first number of IDs of base station transmitter beams belong to a serving base station or another base station.

For example, in the beams corresponding to the no more than a first number of IDs of base station transmitter beams, if the number of beams belonging to the other base station is greater than the number of beams belonging to the serving base station, the terminal equipment is handed over to the other base station, and the a base station transmitter beam serving the terminal equipment is determined according to a beam selection result of the other base station; and in the beams corresponding to the no more than a first number of IDs of base station transmitter beams, if the number of beams belonging to the serving base station is greater than or equal to the number of beams belonging to the other base station, a base station transmitter beam serving the terminal equipment is selected for the terminal equipment according to the beams belonging to the serving base station.

In the embodiment of this disclosure, the database includes multipath fingerprints obtained during an offline training phase and an online learning phase. The offline training phase is a dedicated period of time before network deployment, and beam measurement comes from a large number of beam searches; and the online learning phase is a beam adjustment period, and beam measurement comes from a part of beam searches. The multipath fingerprints are long-term multipath channel characteristics associated with locations, which are obtained through the above beam measurements.

In some embodiments, in the offline training phase, signal detectors may be used to measure different locations within a deployment range, obtain beam measurement results of different locations within the deployment range, take beam measurement results of each location as a record and fill in the database as offline measurement results within the deployment range. The deployment range may be an overall range covered by one or more base stations managed by the intelligent beam management device, such as a factory range of the factory in the scenario shown in FIG. 1 or the scenario shown in FIG. 2; however, this disclosure is not limited thereto, and it may also be specific ranges in other scenarios.

In the embodiment of this disclosure, following contents are taken as fields of a record in the database: a terminal location, a base station transmitter beam ID (TX beam ID), reference signal received power (RSRP), whether it is optimal or not, a weight, and a collected timestamp. The above contents contained in each record are referred to as beam measurement related information of a point or beam measurement related information corresponding to a point. Here, a point is a location, and in the database, a record may also be referred to as an entry.

In the embodiment of this disclosure, the "base station transmitter beam ID (TX beam ID)" is an ID of an optimal base station transmitter beam obtained after beam measurement is performed on the above location. In some embodiments, only transmitter beam IDs are used instead of beam pairs of the network device and the terminal equipment, because the network device does not know a beam ID that is being used by the terminal equipment, and a type and direction of an antenna array of the terminal equipment are also uncertain. In addition, for the sake of simplicity, the "base station transmitter beam ID" here not only indicates a beam ID of the base station, but also includes information on a network device identification (gNB ID) and a transmission and reception point identification (TRP ID) to which it belongs. In other words, each beam of each network device in the entire local 5G network has a unique identification.

In the embodiment of this disclosure, the "reference signal received power (RSRP)" is obtained by performing beam measurement on the above location, and reflects received signal strength of the beams when the beam measurement is performed at the above location.

In the embodiment of this disclosure, "whether it is optimal or not" refers to whether the beam measurement for the above location comes from exhaustive search (global search), and if the beam measurement for the above location comes from exhaustive search, i.e. the above-described large number of beams, the measurement result is deemed as being "optimal", and a field "optimal" of an entry corresponding to the location is set to be "Y"; otherwise, it is deemed that the measurement result is "non-optimal", and a field "optimal" of an entry corresponding to the location is set to be "N".

In the embodiments of this disclosure, the "weight" represents a credibility of a beam measurement result. If the beam measurement is performed in a case of global search, a value of the weight may be set to be 1, and if the beam measurement is not performed in the case of global search, a value of the weight may be set to be between 0 and 1. In some embodiments, the value of the weight is proportional to a proportion of beams participated in the search, the larger the proportion, the greater the value of the weight. When the beams participated in the search are the entire beam set, the value of the weight is 1. What described above are examples only, and the value of the weight may also be set according to other principles, which shall not be described herein any further.

Table 1 below gives an example of an entry of the database.

TABLE 1

| Index | Terminal location | Transmitter beam ID | RSRP | Whether it is optimal or not | Weight | Timestamp |
|---|---|---|---|---|---|---|
| 1 | (x1, y1, z1) | 1 | −65 dbm | Y | 1.0 | 20190923 11:44:51 |
| 2 | (x2, y2, z2) | 4 | −77 dbm | N | 0.6 | 20190925 10:54:12 |
| 3 | (x3, y3, z3) | 1 | −70 dbm | N | 0.8 | 20190926 12:56:22 |
| ... | | | | | | |

In some embodiments, the above whether it is optimal or not, weight and timestamp are optional, and contents about whether it is optimal or not may be added, or contents about the weight may be added, or contents about the timestamp may be added, in beam measurement related information corresponding to each point as demanded. However, this disclosure is not limited thereto, and in addition to the above contents, other contents may be added to the beam measurement related information corresponding to each point as demanded.

According to the above beam measurement related information, beam measurement situations of points (locations) near the terminal equipment may be determined, and beams may be selected for the terminal equipment accordingly, thereby avoiding online training or performing a large number of beam measurements, reducing delay, and reducing a possibility of beam failure or link failure.

In the embodiment of this disclosure, after offline training, all data (fingerprints) are stored in the database, and each record is identified by the location of the terminal equipment. When the terminal equipment is blocked or a signal-to-interference plus noise ratio (SINR) of the terminal equipment is lower than a predetermined threshold (referred to as a first threshold), a beam adjustment process is triggered, that is, the beam management method of the embodiment of this disclosure starts to be carried out.

In the embodiment of this disclosure, methods for determining whether the terminal equipment is blocked and whether the SINR of the terminal equipment is lower than the first threshold are not limited. For example, whether the terminal equipment is blocked may be determined by sensing data of an external sensor, and a particular determination method is not limited in this disclosure. The external sensor may be provided within a movement range of the terminal equipment, and may be the sensor 13 shown in FIG. 1, or the external sensor 23 shown in FIG. 2. For another example, whether the SINR of the terminal equipment is lower than the first threshold may be determined by an event reported by the network device, and a particular determination method is not limited in this disclosure.

In some embodiments, in 301, the predetermined range of the terminal equipment is a range with a location of the terminal equipment as an origin and twice of a maximum positioning error as a radius.

Figure 4:
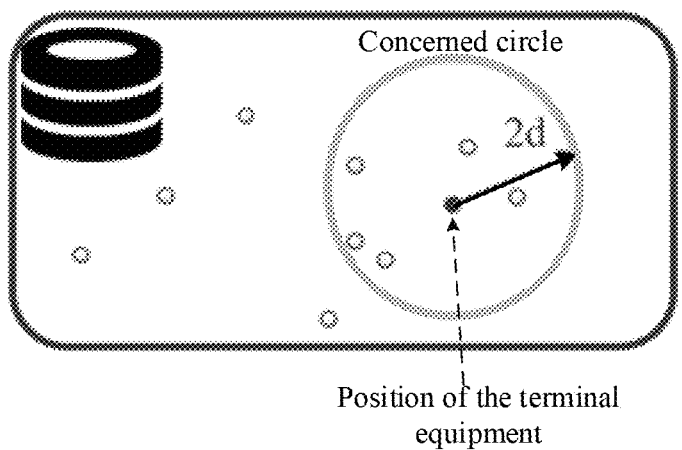
FIG. 4 is a schematic diagram of an example of a predetermined range of the terminal equipment.

When the terminal equipment needs to perform beam alignment, the intelligent beam management device (the MEC server 12 shown in FIG. 1 or the multi-access edge cloud 20 shown in FIG. 2) will query the database and select all points in "a concerned circle" of the location of the terminal equipment in the database. Here, a concept of the "concerned circle" is shown in FIG. 4; where, d is the maximum positioning error. Therefore, 2d is a radius of the "concerned circle" considering positioning errors of the terminal equipment and the points in the database. However, this disclosure is not limited thereto, and the predetermined range of the terminal equipment may also be of other values.

In some embodiments, the above beam measurement related information includes the above "weight", hence, in 302, the number of occurrences of each ID of base station transmitter beams may be: a sum of all weights of all entries corresponding to the ID of base station transmitter beams in all the selected entries.

Still taking the above Table 1 as an example, if entries 1, 2, 3 are selected, that is, entries 1, 2, 3 are points in the concerned circle of the terminal equipment, a weight of entry 1 corresponding to ID "1" of the base station transmitter beams is 1, a weight of entry 3 corresponding to ID "1" of the base station transmitter beams is 0.8 and a weight of entry 2 corresponding to ID "4" of the base station transmitter beams is 0.6, the number of occurrences of ID "1" of the base station transmitter beams is a sum of weights of all entries (i.e. entry 1 and entry 3) corresponding to ID "1" of the base station transmitter beams, that is, 1+0.8=1.8, and the number of occurrences of ID "4" of the base station transmitter beams is a sum of weights of all entries (i.e. entry 2) corresponding to ID "4" of the base station transmitter beams, that is, 0.6.

In some embodiments, the above beam measurement related information does not include the above "weight", and in 302, the number of occurrences of each ID of base station transmitter beams may be: the sum of numbers of all entries corresponding to the ID of base station transmitter beams in all the selected entries.

Still taking the above Table 1 as an example, if entries 1, 2, 3 are selected, that is, entries 1, 2, 3 are points in the concerned circle of the terminal equipment, and ID "1" of the base station transmitter beams corresponds to two entries, i.e. entry 1 and entry 3, the number of occurrences of ID "1" of the base station transmitter beams is 2, and ID "4" of the base station transmitter beams corresponds to one entry, i.e. entry 2, the number of occurrences of ID "4" of the base station transmitter beams is 1.

What described above are examples only, and the number of occurrences of the base station transmitter beam identifications may also be determined in other methods, and this disclosure is not limited thereto.

In some embodiments, in 302, for entries corresponding to points within the predetermined range of the terminal equipment (points in the concerned circle of the terminal equipment), a number (not more than a first number N) of IDs of base station transmitter beams may be selected from these entries according to the number of occurrences of the IDs of base station transmitter beams corresponding to these entries. For example, the IDs of base station transmitter beams are ranked in a descending order of numbers of occurrences of the IDs of base station transmitter beams corresponding to these entries, and then no more than the first number of IDs of base station transmitter beams are selected therefrom.

For example, if the number of IDs of base station transmitter beams corresponding to the points in the concerned circle of the terminal equipment is less than N1, these IDs of base station transmitter beams are all taken as the IDs of base station transmitter beams selected in 302, and if the number of IDs of base station transmitter beams corresponding to the points in the concerned circle of the terminal equipment is greater than N1, N1 IDs of base station transmitter beams of a highest number of occurrences are selected therefrom and are taken as the IDs of base station transmitter beams selected in 302. What described above are examples only, and selection may also be made according to other principles or strategies.

In some embodiments, in 303, if most of beams corresponding to the IDs of base station transmitter beams selected in 302 belong to another base station, that is, the number of beams belonging to the other base station in the beams corresponding to the not more than N1 IDs of base station transmitter beams is greater than the number of beams belonging to the serving base station, in 303, the terminal equipment is handed over to the other base station and is served by the other base station. For example, the other base station performs beam measurement for the terminal equipment and selects beams for the terminal equipment, and in 303, the terminal equipment transmits beams served for the terminal equipment is determined according to the beams selected by the other base station for the terminal equipment.

A beam measurement method adopted by other base station and a method for selecting beams for the terminal equipment are not limited in this disclosure, and reference may be made to related techniques.

In some embodiments, after the other base station selects beams for the terminal equipment, it may feedback a beam selection result for the terminal equipment. In the embodiment of this disclosure, after the beam selection result for the terminal equipment fed back by other base station is received, the foregoing database may be updated. For example, the beam measurement related information (locations, IDs of the transmitted beams, whether it is optimal, RSRP, weights, and timestamps, etc.) of the terminal equipment is acquired according to the beam selection result for the terminal equipment, and is taken as a record or an entry of the terminal equipment or the location of the terminal equipment or a point where the terminal equipment is located to fill in the above database.

In some embodiments, the other base station may feedback whether the beam measurement for the terminal equipment is performed based on global search. If the beam measurement is performed based on the global search, "Y" may be filled in "whether it is optimal or not" (optional) in the entry in the database for the location of the terminal equipment, and the weight (optional) may be set to be "1"; on the contrary, if beam measurement is not based on global search, "N" may be filled in "whether it is optimal or not" (optional) in the entry in the database for the location of the terminal equipment, and the weight (optional) may be set to be of a value less than 1, which may be determined according to the proportion of the beams participating in the beam measurement, and a particular method for determination is not limited in this disclosure.

In some embodiments, in 303, if most of beams corresponding to the IDs of base station transmitter beams selected in 302 belong to the serving base station, that is, the number of beams belonging to the serving base station in the beams corresponding to the not more than N1 IDs of base station transmitter beams is greater than or equal to the number of beams belonging to the other base station, in 303, the base station transmitter beams serving the terminal equipment may be selected by the serving base station for the terminal equipment.

In some embodiments, the intelligent beam management device does not integrate functions of the base station, such as the MEC server 12 shown in FIG. 1, and the intelligent beam management device transmits the not more than N1 IDs of base station transmitter beams to the serving base station, and the base station transmitter beams serving the terminal equipment is selected by the serving base station for the terminal equipment.

For example, the intelligent beam management device transmits to the serving base station the IDs of base station transmitter beams of beams belonging to the serving base station in the beams corresponding to the not more than N1 IDs of base station transmitter beams and a maximum value RSRP_top in received signal power strengths corresponding to these beams in the concerned circle (i.e. the database), so that the serving base station selects suitable base station transmitter beams for the terminal equipment.

Figure 5:
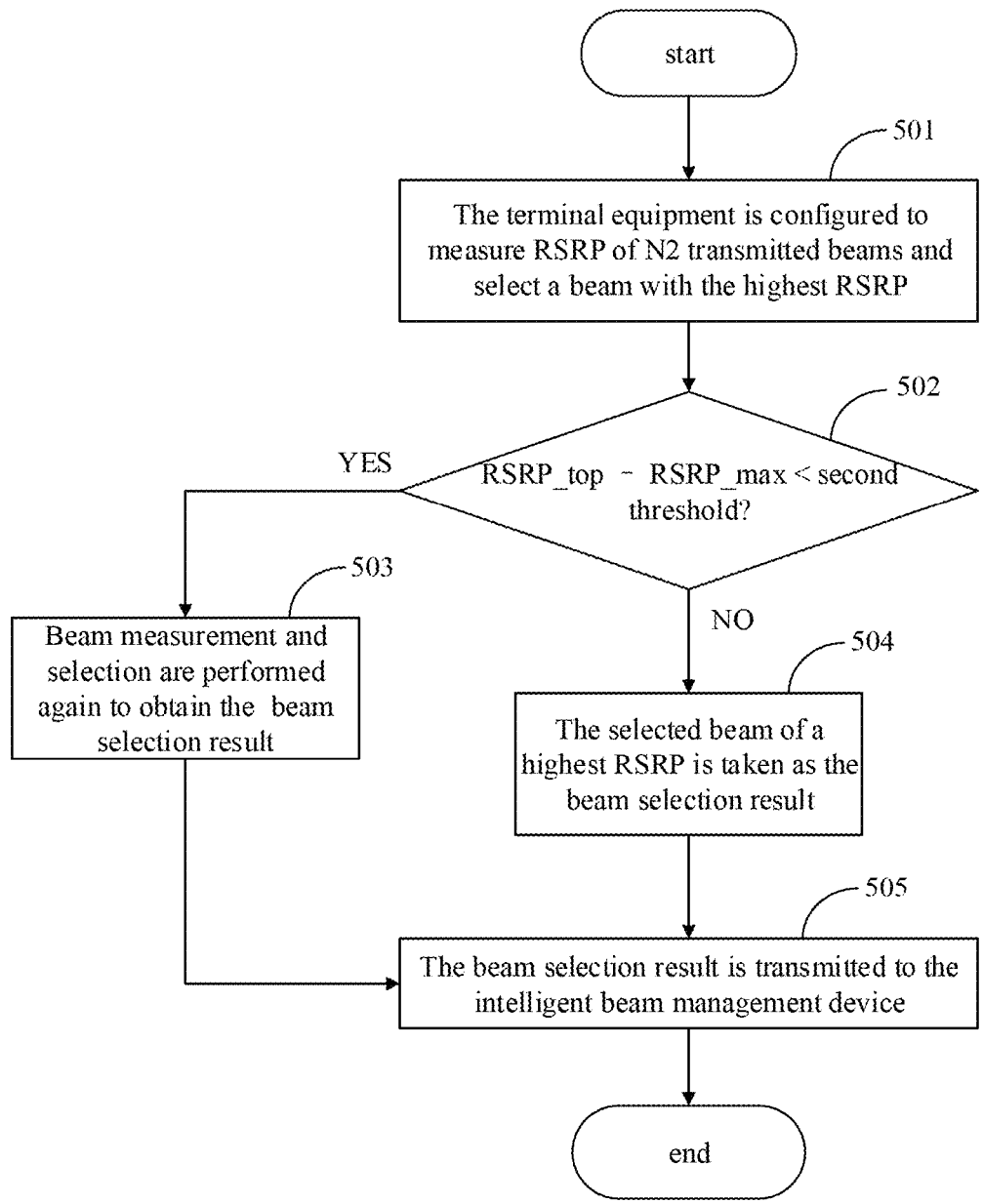
FIG. 5 is a schematic diagram of an example of selecting suitable beams by the serving base station for the terminal equipment.

FIG. 5 is a schematic diagram of an example of selecting suitable beams by the serving base station for the terminal equipment. As shown in FIG. 5, the process includes:

501: the terminal equipment is configured to perform received signal power strength (RSRP) measurement on the beams belonging to the serving base station (assumed to be N2, $N2 \leq N1$) in the beams corresponding to the not more than N1 IDs of base station transmitter beams and select a beam with the highest received signal power strength;

502: it is determined whether a difference (RSRP_max−RSRP_top) between the received signal power strength RSRP_max (in unit of dBm) of the selected beams and the above received highest received signal power strength RSRP_top (in unit of dBm) is less than a second threshold, the second threshold being of a negative value, such as −1 dB;

503: beam adjustment (such as beam measurement and selection) is performed again for the terminal equipment if it is determined yes; the beam adjustment here is a conventional base station beam management function, and reference may be made to related techniques for a particular implementation, which is not limited in this disclosure; for example, precise beam alignment or beam training may be performed by using an advanced algorithm to obtain a beam selection result;

504: a selected beam with the highest RSRP is taken as the beam selection result if it is determined no; and 505: the beam selection result is transmitted to the intelligent beam management device.

In the example of FIG. 5, after receiving the beam selection result fed back by the serving base station, the intelligent beam management device updates the above database according to the beam selection result.

In some embodiments, a method for updating the database by the intelligent beam management device according to the beam selection result is similar to what is described above, which may be obtaining the beam measurement related information (locations, IDs of the transmitted beams, RSRP, and optionally, whether it is optimal, weights and/or timestamps) of the terminal equipment according to the received beam selection result, and filling the beam measurement related information of the terminal equipment in the database.

For example, if the received beam selection result is obtained in 503, the beam measurement performed for the terminal equipment may be based on global search, and the "whether it is optimal or not" in a corresponding entry in the database may be set to be "Y", and the "weight" may be set to be 1.

For another example, if the received beam selection result is obtained in 504, the beam measurement performed for the terminal equipment is not based on global search, and the "whether it is optimal or not" in a corresponding entry in the database may be set to be "N", and the "weight" may be set to be of a value less than 1.

In some embodiments, the intelligent beam management device integrates the functions of the base station, such as the multiple-access edge cloud 20 shown in FIG. 2, the intelligent beam management device may directly select beams for the terminal equipment.

Figure 6:
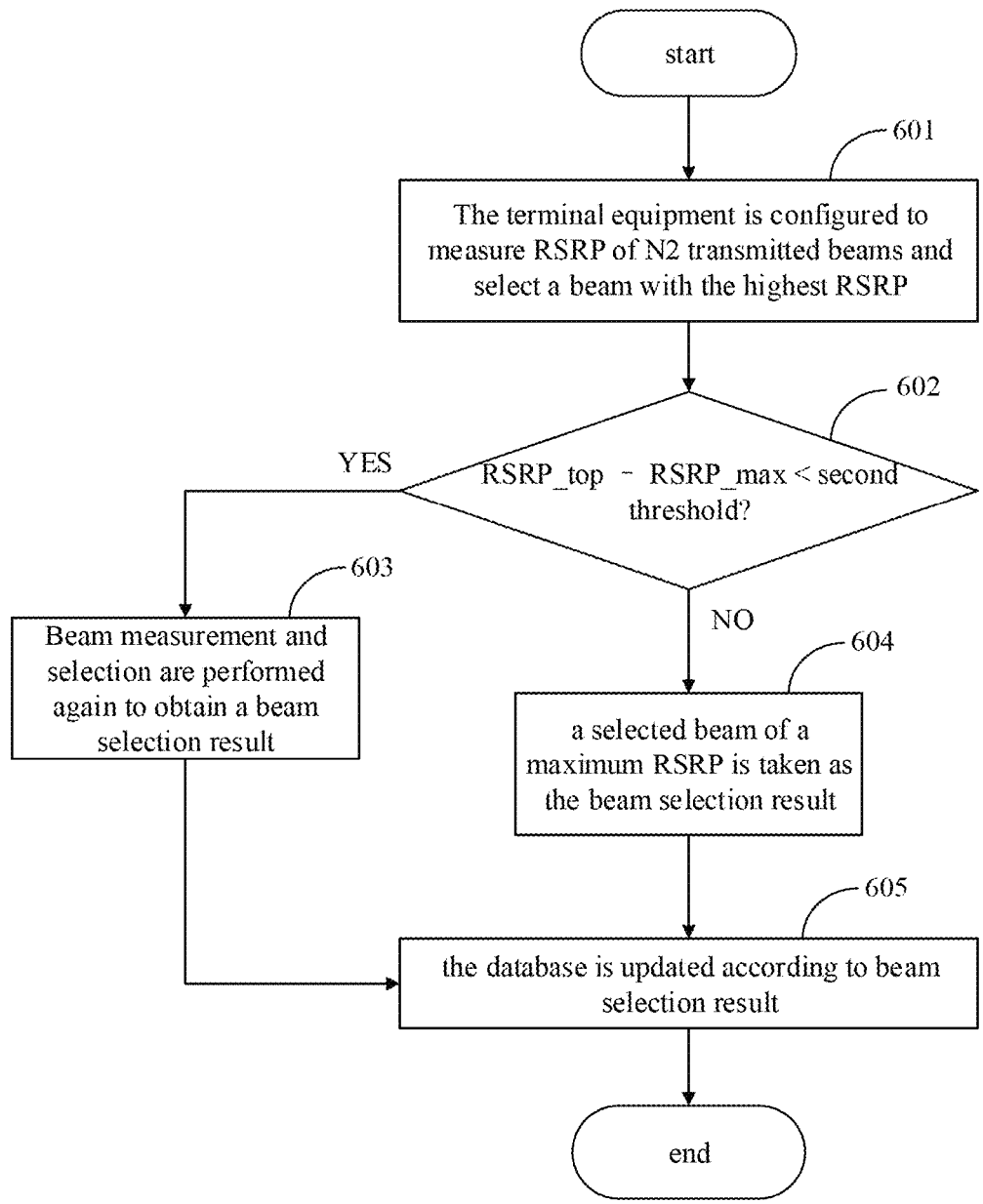
FIG. 6 is a schematic diagram of an example of selecting suitable beams by an intelligent beam management device integrating functions of a base station for the terminal equipment.

FIG. 6 is a schematic diagram of an example of selecting suitable beams by the intelligent beam management device integrating the functions of the base station for the terminal equipment. As shown in FIG. 6, the process includes:

601: the terminal equipment is configured to perform received signal power strength (RSRP) measurement on no more than N1 (assumed to be N2, N2=N1, in a deployment range, the intelligent beam management device is the serving base station) beams corresponding to the no more than N1 IDs of base station transmitter beams, and select a beam with the highest received signal power strength;

602: it is determined whether a difference (RSRP_max−RSRP_top) between the received signal power strength RSRP_max (in unit of dBm) of the selected beam and a maximum value RSRP_top (in unit of dBm) of the received signal power strengths corresponding to the N2 beams in the database is less than the second threshold, the second threshold being of a negative value, such as −1 dB;

603: beam adjustment (such as beam measurement and selection) for the terminal equipment is performed again if it is determined yes; similar to 503, performing the beam adjustment is a conventional base station beam management function, and reference may be made to related techniques for a particular implementation, which is not limited in this disclosure; for example, precise beam alignment or beam training may be performed by using an advanced algorithm to obtain a beam selection result;

604: a selected beam with the highest RSRP is taken as the beam selection result if it is determined no; and

605: the database is updated according to beam selection result.

In the example of FIG. 6, operations of 601 to 604 are identical to operations of 501 to 504 of the example of FIG. 5, which shall not be described herein any further.

In the example of FIG. 6, the operation of 605 is identical to the operation of updating the database by the intelligent beam management device in the example of FIG. 5, that is, acquiring the beam measurement related information of the terminal equipment (locations, IDs of the transmitted beams, RSRP, and optionally, whether it is optimal, weights and/or timestamps) according to beam selection result, and filling the beam measurement related information of the terminal equipment in the database.

For example, if the beam selection result is obtained in 603, the beam measurement performed for the terminal equipment may be based on global search, and the "whether it is optimal or not" in a corresponding entry in the database may be set to be "Y", and the "weight" may be set to be 1.

For another example, if the beam selection result is obtained in 604, the beam measurement performed for the terminal equipment is not based on global search, and the "whether it is optimal or not" in a corresponding entry in the database may be set to be "N", and the "weight" may be set to be of a value less than 1.

Figure 7:
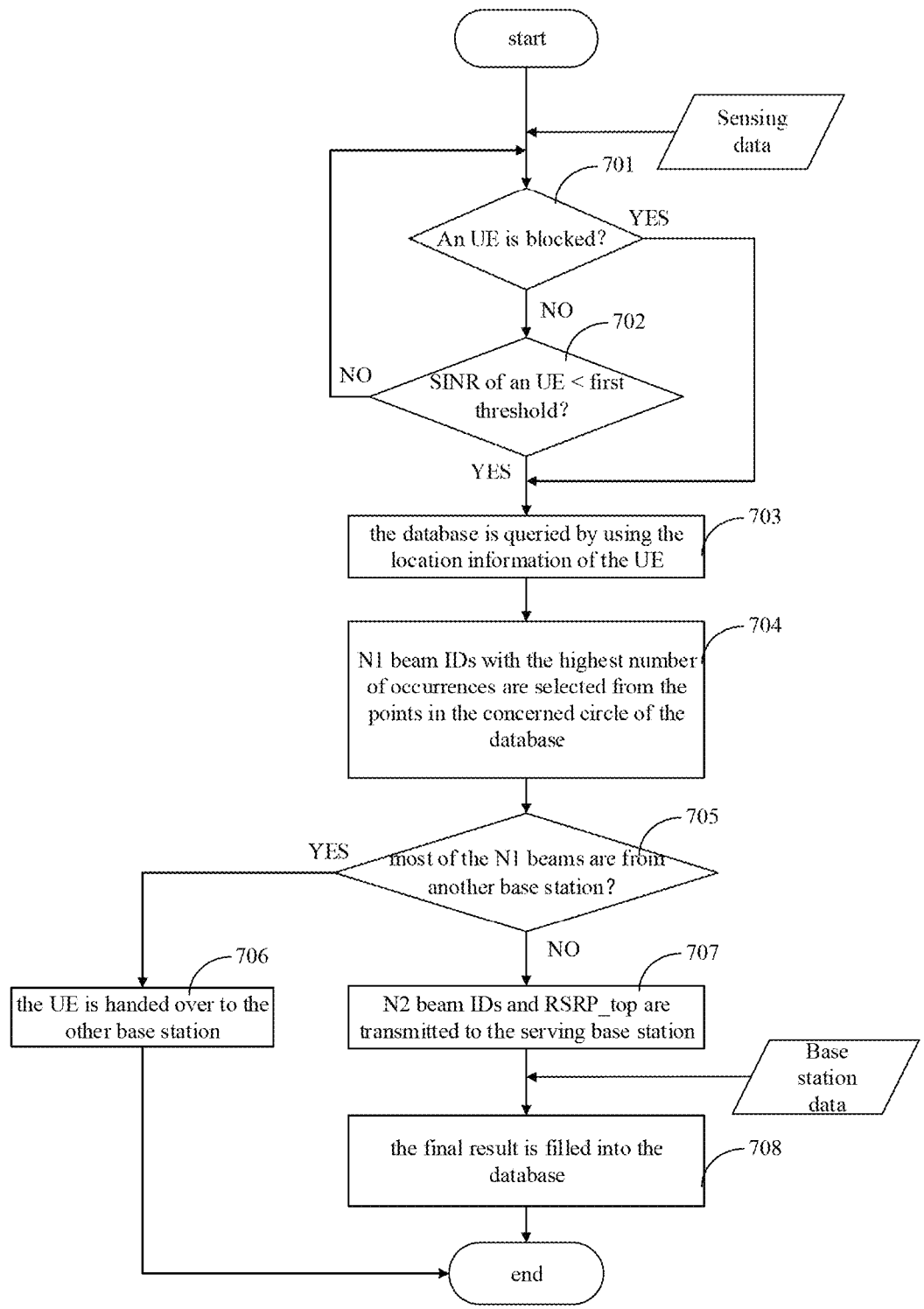
FIG. 7 is a schematic diagram of an example of a processing process of an MEC server 12.

The method of the embodiment of this disclosure shall be described below by taking the scenario shown in FIG. 1 as an example. FIG. 7 is a schematic diagram of an example of a processing process of the MEC server 12. As shown in FIG. 7, the process includes:

701: it is determined whether the UE is blocked according to the sensing data from the external sensors, if it is determined yes, a beam management process of this disclosure is started, and 703 is executed, and if it is determined no, 702 is executed;

702: it is determined whether the SINR of the UE is less than the first threshold, and if it is determined yes, 703 is executed, and if it is determined no, that is, neither the UE is blocked nor its SINR is reduced to a certain extent, and 701 is executed;

703: the database is queried by using the position information of the UE;

704: N1 beam IDs with the highest number of occurrences are selected from the points in the concerned circle of the UE;

705: it is determined whether most of the N1 beams corresponding to the N1 beam IDs are from another base station, if it is determined yes, 706 is executed, and if it is determined no, 707 is executed;

706: the UE is handed over to the other base station;

707: N2 beam IDs are transmitted to the serving base station, and the N2 beams corresponding to the N2 beam IDs belong to the above serving base station; and

708: the beam selection result (the data of base station) fed back by the serving base station is received, and the beam selection result is filled in the database.

In the example of FIGS. 7, 701 and 702 are optional, that is, only 701 or only 702 is contained, or neither 701 nor 702 is contained.

In 703 and 704, the database is queried by using the position information of the UE. From the points in the concerned circle of the UE, not more than N1 beam IDs with the highest number of occurrences are selected. In calculating the number of occurrences, weights may be used. For example, in Table 1, a weight of point 1 (an entry with an index 1) is 1.0, a weight of point 2 (an entry with an index 2) is 0.6, and a weight of point 3 (an entry with an index 3) is 0.8. Therefore, the number of occurrences of beam id #1 is 1+0.8=1.8, and the number of occurrences of beam id #4 is 0.6. All the number of occurrences of all identical beam IDs in the concerned circle are summed up to find not more than N1 beam IDs with the highest number of occurrences of weights.

In 705 and 706, if most of the N1 beams are from a neighboring base station, the UE is handed over to the neighboring base station. After the handover and standard beam training process, a new base station will report the beam selection result to the MEC server 12. Then, the MEC server 12 updates the database with beam IDs of the new base station and other fields in the database. As beam training is exhaustive (or exhaustive-like) search, this result is deemed as being optimal. Therefore, a relatively high value, such as 1.0, is used for a weight of the record.

In 707 and 708, if most (such as N2) of the N1 beams are from the serving base station, the MEC server 12 transmits these beam IDs and the highest RSRP value RSRP_top in these beams to the serving base station, and the serving base station may start the beam adjustment process illustrated in FIG. 5. For example, the serving base station configures the UE to measure the RSRP of N2 transmit beams by configuring CSI (channel state information) resource settings, including SS (synchronization signal) blocks and a CSI-RS (channel state information reference signal) resource set, and the UE feeds back measured beam IDs with the largest RSRP. If the measured RSRP_max−RSRP_top≥the second threshold, the fed back beams are selected, and the serving base station reports the beam selection result to the MEC server 12 to update the database.

As the above beam selection result is obtained based on partial search, it indicates that only N2 times of beam measurement are performed, and the weight of this record is less than 1.0. Otherwise, it indicates that the selected beams are not good enough, which may be caused by environmental changes. Accurate beam alignment or beam training is required to select optimal beams and report to the MEC server 12 to further update the database. At this moment, if the performed beam alignment or beam training is obtained based on a global search, the weight of the record is equal to 1.0. The MEC server 12 is responsible for maintaining the database, such as deleting a part of historical records according to the timestamps after a period of time.

The method of the embodiment of this disclosure is applicable to a TDD system, and therefore, it may be applicable to mmWave deployment; however, this disclosure is not limited thereto. In addition, the beam alignment result (beam measurement result) of the embodiment of this disclosure may be applicable to both downlink and uplink.

It should be noted that FIGS. 3, 5, 6 and 7 only schematically illustrate the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what are contained in FIGS. 3, 5, 6 and 7.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

According to the embodiment of this disclosure, as described above, online training or a large number of beam measurement may be avoided, delay may be reduced, and a possibility of beam failure or link failure may be reduced. Moreover, this disclosure provides a novel location-based online learning method for 5G millimeter wave beam management, which may be adapted to environmental changes, and may improve beam adjustment efficiency.

Embodiment of a Second Aspect

The embodiment of this disclosure provides a beam management apparatus, which may be an intelligent beam management device, or may be one or more components or assemblies configured in an intelligent beam management device. The intelligent beam management device may be, for example, the MEC server 12 in the example in FIG. 1, or may be, for example, the multiple-access edge cloud 20 in the example in FIG. 2. Principles of the beam management apparatus of the embodiment of this disclosure correspond to that of the method in the embodiment of the first aspect, and contents in this embodiment identical to those in the embodiment of the first aspect shall not be described herein any further.

Figure 8:
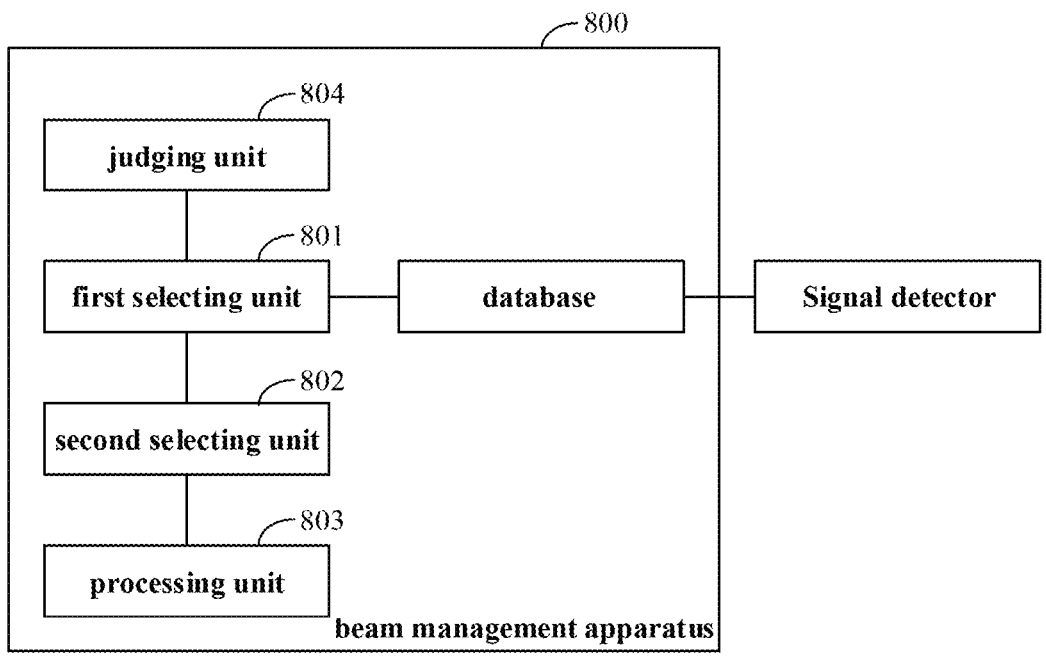
FIG. 8 is a schematic diagram of the beam management apparatus of an embodiment of this disclosure.

FIG. 8 is a schematic diagram of the beam management apparatus of the embodiment of this disclosure. As shown in FIG. 8, a beam management apparatus 800 of the embodiment of this disclosure includes: a first selecting unit 801, a second selecting unit 802 and a processing unit 803. The first selecting unit 801 queries a database according to position information $(x_0, y_0, z_0)$ of a terminal equipment, the database including multiple entries, each entry containing beam measurement related information of a point $(x_i, y_i, z_i)$, and selects entries corresponding to points in a predetermined range of the terminal equipment from the database; the second selecting unit 802 selects no more than the first number of IDs of base station transmitter beams with the highest number of occurrences among IDs of base station transmitter beams from all the selected entries; and the processing unit 803 selects a base station transmitter beam serving the terminal equipment according to whether beams corresponding to the no more than the first number of IDs of base station transmitter beams belong to a serving base station or another base station;

wherein, in the beams corresponding to the no more than the first number of IDs of base station transmitter beams, if the number of beams belonging to the other base station is greater than the number of beams belonging to the serving base station, the processing unit 803 hands the terminal equipment over to the other base station, and determines a base station transmitter beam serving the terminal equipment according to a beam selection result of the other base station; and in the beams corresponding to the no more than the first number of IDs of base station transmitter beams, if the number of beams belonging to the serving base station is greater than or equal to the number of beams belonging to the other base station, the processing unit 803 selects a base station transmitter beam serving the terminal equipment according to the beams belonging to the serving base station.

In some embodiments, beam measurement related information of each point includes part or all of the following information: a position $(x_i, y_i, z_i)$ of the point; an ID of a base station transmitter beam (TX beam ID) corresponding to the point; a received signal power strength (RSRP) corresponding to the point; whether a beam measurement result corresponding to the point is optimal; a weight corresponding to the point; and a timestamp corresponding to the point.

In some embodiments, the predetermined range of the terminal equipment is a range with a position of the terminal equipment as an origin and twice of a maximum positioning error as a radius.

In some embodiments, the number of occurrences of each ID of base station transmitter beam is a sum of all weights of all entries corresponding to the ID of base station transmitter beam in all the selected entries, or a sum of numbers of all entries corresponding to the ID of base station transmitter beam in all the selected entries.

In some embodiments, the determining the base station transmitter beams serving the terminal equipment by the processing unit 803 according to a beam selection result of the other base station includes:

receiving a beam selection result for the terminal equipment fed back by the other base station; and updating the database according to the beam selection result.

For example, the beam measurement related information of the terminal equipment is acquired, and the beam measurement related information of the terminal equipment is filled in the database.

In some embodiments, the selecting the base station transmitter beams serving the terminal equipment by the processing unit 803 according to the beams belonging to the serving base station includes:

transmitting to the serving base station IDs of base station transmitter beams of the beams belonging to the serving base station in the beams corresponding to the no more than a first number of IDs of base station transmitter beams and the highest received signal power strength corresponding to these beams;

receiving a beam selection result fed back by the serving base station; and updating the database according to the beam selection result.

For example, the beam measurement related information of the terminal equipment is acquired, and the beam measurement related information of the terminal equipment is filled in the database.

In some embodiments, the selecting the base station transmitter beams serving the terminal equipment by the processing unit 803 according to the beams belonging to the serving base station includes:

configuring the terminal equipment to perform received signal power strength measurement on the beams corresponding to the no more than a first number of IDs of base station transmitter beams and selecting a beam with the highest received signal power strength;

determining whether a difference between the received signal power strength of the selected beam and the highest received signal power strength in the received signal power strengths associated with the beams corresponding to the no more than a first number of IDs of base station transmitter beams in the database is less than a second threshold;

performing beam adjustment for the terminal equipment to obtain a beam selection result if it is determined yes;

taking the selected beam as the beam selection result if it is determined no; and updating the database according to the beam selection result.

For example, the beam measurement related information of the terminal equipment is acquired, and the beam measurement related information of the terminal equipment is filled in the database.

In some embodiments, as shown in FIG. 8, records in the database include beam measurement results at different positions in a deployment range obtained by performing measurement on different positions in the deployment range by a signal detector, a beam measurement result at each position being taken as a record and filled in the database, and being taken as an offline measurement result in the deployment range; wherein the deployment range is an overall range covered by one or more base stations managed by an intelligent beam management device.

In some embodiments, as shown in FIG. 8, the beam management apparatus 800 of the embodiment of this disclosure further includes:

a determining unit 804 configured to determine whether the terminal equipment is blocked or whether a signal to interference plus noise ratio of the terminal equipment is less than a first threshold;

and the first selecting unit 801 queries the database when it is determined yes by the determining unit 804, and selects entries corresponding to points in the predetermined range of the terminal equipment from the database.

Furthermore, for the sake of simplicity, connection relationships between the components or modules or signal profiles thereof are only illustrated in FIG. 8. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

According to the embodiment of this disclosure, online training or a large number of beam measurement may be avoided, delay may be reduced, and a possibility of beam failure or link failure may be reduced. Moreover, this disclosure provides a novel location-based online learning method for 5G millimeter wave beam management, which may be adapted to environmental changes, and may improve beam adjustment efficiency.

Embodiment of a Third Aspect

The embodiment of this disclosure provides a communication system. FIG. 1 is a schematic diagram of the communication system, and FIG. 2 is another schematic diagram of the communication system. Contents in this embodiment identical to those in the embodiments of the first and second aspects shall not be described herein any further.

In some embodiments, as shown in FIG. 1, the communication system includes: a network device 11, an MEC server 12 and a terminal equipment 14. For the convenience of description, one terminal equipment 14 is shown in FIG. 1. In the embodiment of this disclosure, as shown in FIG. 1, optionally, the communication system may further include an external sensor 13, which may be a camera or a radar; however, this disclosure is not limited thereto. In the embodiment of this disclosure, any form of communication may be performed between the network device 11 and the terminal equipment 14.

In some embodiments, as shown in FIG. 2, the communication system includes: an active antenna unit AAU, a multi-access edge cloud 20, and a terminal equipment (not shown in FIG. 2). In the embodiment of this disclosure, the multi-access edge cloud 20 integrates the functions of a network device, and any form of communication may be performed between the multi-access edge cloud 20 and the terminal equipment.

The embodiment of this disclosure further provides an intelligent beam management device, which may be, for example, the MEC server 12 shown in FIG. 1, or may be the multiple-access edge cloud 20 shown in FIG. 2. However, this disclosure is not limited to this, and it may also be other intelligent beam management devices.

Figure 9:
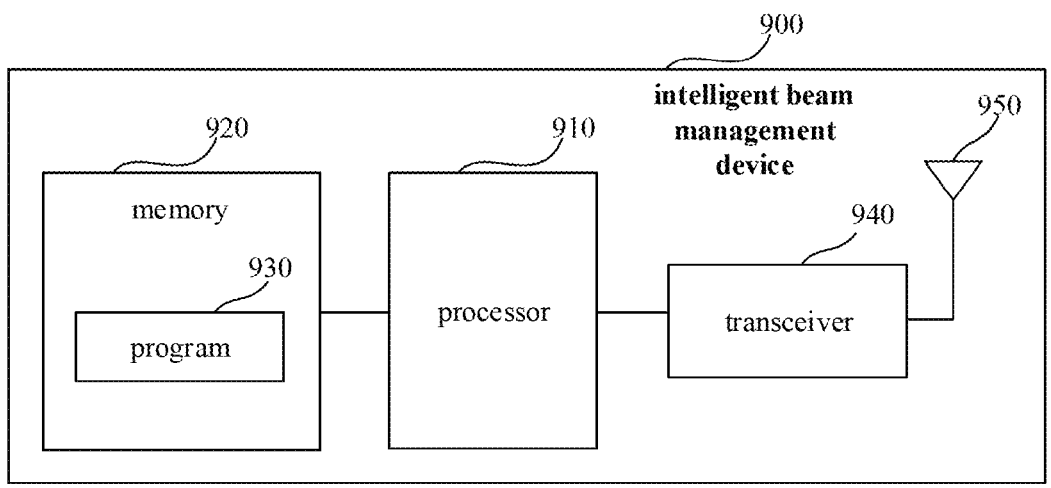
FIG. 9 is a schematic diagram of a structure of the intelligent beam management device of an embodiment of this disclosure.

FIG. 9 is a schematic diagram of a structure of the intelligent beam management device of the embodiment of this disclosure. As shown in FIG. 9, an intelligent beam management device 900 may include: a processor 910 (such as a central processing unit CPU) and a memory 920, the memory 920 being coupled to the processor 910. The memory 920 may store various data; and furthermore, it may store a program 930 for information processing, and execute the program 930 under control of the processor 910.

For example, the processor 910 may be configured to execute the program to carry out the method described in the embodiment of the first aspect. For example, the processor 910 may be configured to perform the following control: querying a database according to position information ($x_0$, $y_0$, $z_0$) of a terminal equipment, the database including multiple entries, each entry containing beam measurement related information of a point ($x_i$, $y_i$, $z_i$), and selecting entries corresponding to points in a predetermined range of the terminal equipment from the database; selecting no more than a first number of IDs of base station transmitter beams with the highest number of occurrences among IDs of base station transmitter beams from all the selected entries; and determining a base station transmitter beam serving the terminal equipment according to whether beams corresponding to the no more than a first number of IDs of base station transmitter beams belong to a serving base station or another base station; wherein in the beams corresponding to the no more than a first number of IDs of base station transmitter beams, if the number of beams belonging to the other base station is greater than the number of beams belonging to the serving base station, the terminal equipment is handed over to the other base station, and the a base station transmitter beam serving the terminal equipment is determined according to a beam selection result of the other base station; and in the beams corresponding to the no more than a first number of IDs of base station transmitter beams, if the number of beams belonging to the serving base station is greater than or equal to the number of beams belonging to the other base station, a base station transmitter beam serving the terminal equipment is selected for the terminal equipment according to the beams belonging to the serving base station.

Furthermore, as shown in FIG. 9, the intelligent beam management device 900 may include: a transceiver 940, and an antenna 950, etc.; wherein functions of the above components are similar to those of the related art, and shall not be described herein any further. It should be noted that the intelligent beam management device 900 does not necessarily include all the components shown in FIG. 9; and furthermore, the intelligent beam management device 900 may include components not shown in FIG. 9, and reference may be made to the related art.

An embodiment of this disclosure provides a computer readable program, which, when executed in an intelligent beam management device, will cause the intelligent beam management device to carry out the method as described in the embodiment of the first aspect.

An embodiment of this disclosure provides a storage medium stored a computer readable program, which will cause an intelligent beam management device to carry out the method as described in the embodiment of the first aspect.

The above apparatus, device and method of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

1. A beam management method, wherein the method includes:

querying a database according to position information ($x_0$, $y_0$, $z_0$) of a terminal equipment, the database including multiple entries, each entry containing beam measurement related information of a point ($x_i$, $y_i$, $z_i$), and selecting entries corresponding to points in a predetermined range of the terminal equipment from the database;

selecting no more than a first number of IDs of base station transmitter beams with the highest number of occurrences among IDs of base station transmitter beams from all the selected entries; and determining base station transmitter beams serving the terminal equipment according to whether beams corresponding to the no more than a first number of IDs of base station transmitter beams belong to a serving base station or another base station;

wherein, in the beams corresponding to the no more than a first number of IDs of base station transmitter beams, if the number of beams belonging to the other base station is greater than the number of beams belonging to the serving base station, the processing unit hands the terminal equipment over to the other base station, and determines a base station transmitter beam serving the terminal equipment according to a beam selection result of the other base station;

and in the beams corresponding to the no more than a first number of IDs of base station transmitter beams, if the number of beams belonging to the serving base station is greater than or equal to the number of beams belonging to the other base station, the processing unit selects a base station transmitter beam serving the terminal equipment according to the beams belonging to the serving base station.

2. The method according to supplement 1, wherein beam measurement related information of each point includes following information:

a position $(x_i, y_i, z_i)$ of the point;
an ID of a base station transmitter beam (gNB beam ID) corresponding to the point; and
a received signal power strength (RSRP) corresponding to the point.

3. The method according to supplement 2, wherein the beam measurement related information of each point further includes:

whether a beam measurement result corresponding to the point is optimal; and/or
a weight corresponding to the point.

4. The method according to supplement 2, wherein the beam measurement related information of each point further includes:

a timestamp corresponding to the point.

5. The method according to supplement 1, wherein the predetermined range of the terminal equipment is a range with a position of the terminal equipment as an origin and twice of a maximum positioning error as a radius.

6. The method according to supplement 1, wherein the number of occurrences of an ID of each base station transmitter beam is a sum of all weights of all entries corresponding to the ID of base station transmitter beam in all the selected entries, or a sum of numbers of all entries corresponding to the ID of base station transmitter beam in all the selected entries.

7. The method according to supplement 1, wherein the determining the base station transmitter beams serving the terminal equipment according to a beam selection result of the other base station includes:

receiving a beam selection result for the terminal equipment fed back by the other base station; and
updating the database according to the beam selection result.

8. The method according to supplement 7, wherein the updating the database according to the beam selection result includes:

acquiring beam measurement related information of the terminal equipment; and
filling the beam measurement related information of the terminal equipment into the database.

9. The method according to supplement 1, wherein the selecting base station transmitter beams serving the terminal equipment according to the beams belonging to the serving base station includes:

transmitting to the serving base station IDs of base station transmitter beams of the beams belonging to the serving base station in the beams corresponding to the no more than a first number of IDs of base station transmitter beams and the highest received signal power strength corresponding to these beams;

receiving a beam selection result fed back by the serving base station; and
updating the database according to the beam selection result.

10. The method according to supplement 9, wherein the updating the database according to the beam selection result includes:

acquiring beam measurement related information of the terminal equipment; and
filling the beam measurement related information of the terminal equipment into the database.

11. The method according to supplement 1, wherein the selecting base station transmitter beams serving the terminal equipment according to the beams belonging to the serving base station includes:

configuring the terminal equipment to perform received signal power strength measurement on the beams corresponding to the no more than a first number of IDs of base station transmitter beams and selecting a beam with the highest received signal power strength;

determining whether a difference between the received signal power strength of the selected beam and the highest received signal power strength in the received signal power strengths associated with the beams corresponding to the no more than a first number of IDs of base station transmitter beams in the database is less than a second threshold;

performing beam adjustment for the terminal equipment to obtain a beam selection result if it is determined yes;

taking the selected beam as the beam selection result if it is determined no; and updating the database according to the beam selection result.

12. The method according to supplement 11, wherein the updating the database according to the beam selection result includes:

acquiring beam measurement related information of the terminal equipment; and
filling the beam measurement related information of the terminal equipment into the database.

13. The method according to supplement 1, wherein the method further includes:

performing measurement on different positions in a deployment range by a signal detector to obtain beam measurement results of the different positions in the deployment range;

taking a beam measurement result of each position as a record and filling in the database, and taking the record as an offline measurement result in the deployment range;

wherein the deployment range is an overall range covered by one or more base stations managed by an intelligent beam management device.

14. The method according to supplement 1, wherein the method further includes:

determining whether the terminal equipment is blocked or whether a signal to interference plus noise ratio of the terminal equipment is less than a first threshold; and querying the database when it is determined yes, and selecting entries corresponding to points in the predetermined range of the terminal equipment from the database.

15. An intelligent beam management device, wherein the intelligent beam management device includes a processor and a memory, the memory storing a computer program, and the processor being configured to execute the computer program to carry out the following beam management method:

querying a database according to position information ($x_0$, $y_0$, $z_0$) of a terminal equipment, the database including multiple entries, each entry containing beam measurement related information of a point ($x_i$, $y_i$, $z_i$), and selecting entries corresponding to points in a predetermined range of the terminal equipment from the database;

selecting no more than a first number of IDs of base station transmitter beams with the highest number of occurrences among IDs of base station transmitter beams from all the selected entries; and determining base station transmitter beams serving the terminal equipment according to whether beams corresponding to the no more than a first number of IDs of base station transmitter beams belong to a serving base station or another base station;

wherein, in the beams corresponding to the no more than a first number of IDs of base station transmitter beams, if the number of beams belonging to the other base station is greater than the number of beams belonging to the serving base station, the processing unit hands the terminal equipment over to the other base station, and determines a base station transmitter beam serving the terminal equipment according to a beam selection result of the other base station;

and in the beams corresponding to the no more than a first number of IDs of base station transmitter beams, if the number of beams belonging to the serving base station is greater than or equal to the number of beams belonging to the other base station, the processing unit selects a base station transmitter beam serving the terminal equipment according to the beams belonging to the serving base station.

What is claimed is:

1. A beam management apparatus, characterized in that the apparatus comprises:
   a first selecting unit configured to query a database according to position information of a terminal equipment, the database comprising multiple entries, each entry recording beam measurement related information of a position, and select entries corresponding to positions in a predetermined range area of the position of the terminal equipment from the database;
   a second selecting unit configured to select a first number of base station transmitter beam identifiers the highest number of occurrences from all the selected entries; and
   a processing unit configured to determine base station transmitter beams serving the terminal equipment according to whether beams corresponding to the selected a first number of base station transmitter beam identifiers belong to a serving base station or another base station;
   wherein, in the beams corresponding to the selected a first number of base station transmitter beam identifiers, if the number of beams belonging to the other base station is greater than the number of beams belonging to the serving base station, the processing unit hands the terminal equipment over to the other base station, and determines a base station transmitter beam serving the terminal equipment according to a beam selection result of the other base station;
   and in the beams corresponding to the selected a first number of base station transmitter beam identifiers, if the number of beams belonging to the serving base station is greater than or equal to the number of beams belonging to the other base station, the processing unit selects a base station transmitter beam serving the terminal equipment according to the beams belonging to the serving base station.

2. The apparatus according to claim 1, wherein beam measurement related information of each position comprises part or all of the following information:
   a position information of the position;
   a base station transmitter beam identifier corresponding to the position;
   a received signal power strength corresponding to the position;
   whether a beam measurement result corresponding to the position is optimal;
   a weight corresponding to the position; and
   a timestamp corresponding to the position.

3. The apparatus according to claim 1, wherein the predetermined range area of the position of the terminal equipment is a range area with a position of the terminal equipment as an origin and twice of a maximum positioning error as a radius.

4. The apparatus according to claim 1, wherein the number of occurrences of each base station transmitter beam identifier is the sum of all weights of all entries corresponding to the base station transmitter beam identifier in all the selected entries, or the sum of numbers of all entries corresponding to the base station transmitter beam identifier in all the selected entries.

5. The apparatus according to claim 1, wherein the determining the beams serving the terminal equipment by the processing unit according to a beam selection result of the other base station comprises:
   receiving a beam selection result for the terminal equipment fed back by the other base station; and
   updating the database according to the beam selection result.

6. The apparatus according to claim 5, wherein the updating the database by the processing unit according to the beam selection result comprises:
   acquiring beam measurement related information of the terminal equipment; and
   filling the beam measurement related information of the terminal equipment into the database.

7. The apparatus according to claim 1, wherein the selecting a base station transmitter beam serving the terminal equipment by the processing unit according to the beams belonging to the serving base station comprises:
   transmitting, to the serving base station, base station transmitter beam identifiers the beams belonging to the serving base station in the beams corresponding to the selected a first number of base station transmitter beam identifiers and the highest received signal power strength corresponding to these beams;
   receiving a beam selection result fed back by the serving base station; and
   updating the database according to the beam selection result.

8. The apparatus according to claim 1, wherein the selecting a base station transmitter beam serving the terminal equipment by the processing unit according to the beams belonging to the serving base station comprises:
   configuring the terminal equipment to perform received signal power strength measurement on the beams corresponding to the selected a first number of base station transmitter beam identifiers and selecting a beam with the highest received signal power strength;

determining whether a difference between the received signal power strength of the selected beam and the highest received signal power strength in the received signal power strengths associated with the beams corresponding to the selected a first number of base station transmitter beam identifiers in the database is less than a second threshold; performing beam adjustment for the terminal equipment to obtain a beam selection result if it is determined yes; taking the selected beam as the beam selection result if it is determined no; and updating the database according to the beam selection result.

9. The apparatus according to claim 1, wherein,
records in the database comprise beam measurement results at different positions in a deployment range area obtained by performing measurement on different positions in the deployment range area by a signal detector, a beam measurement result at each position being taken as a record and filled in the database, and being taken as an offline measurement result in the deployment range area;
wherein the deployment range area is an overall range area covered by one or more base stations managed by an intelligent beam management device.

10. The apparatus according to claim 1, wherein the apparatus further comprises:
a determining unit configured to determine whether the terminal equipment is blocked or whether a signal to interference plus noise ratio of the terminal equipment is less than a first threshold; and
the first selecting unit queries the database when it is determined yes, and selects entries corresponding to positions the predetermined range area of the position of the terminal equipment from the database.

* * * * *